United States Patent
Oda et al.

(10) Patent No.: US 6,856,892 B2
(45) Date of Patent: Feb. 15, 2005

(54) NAVIGATION APPARATUS AND INFORMATION SERVER

(75) Inventors: Tamami Oda, Tsurugashima (JP); Tomo Watanabe, Tsurugashima (JP); Tsuyoshi Sato, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/254,774

(22) Filed: Sep. 26, 2002

(65) Prior Publication Data

US 2003/0065440 A1 Apr. 3, 2003

(30) Foreign Application Priority Data

Sep. 28, 2001 (JP) .................................... P2001-304018

(51) Int. Cl.⁷ ................................................ G09G 5/00
(52) U.S. Cl. ........................ 701/202; 345/841; 345/834; 455/414
(58) Field of Search ................................. 701/202, 209, 701/211; 345/841, 834; 455/414, 457, 456, 412, 569; 340/870.02, 870.28, 10.1, 10.41, 993, 990, 995; 706/45; 342/353.13

(56) References Cited

U.S. PATENT DOCUMENTS

| | | | |
|---|---|---|---|
| 6,125,326 A | | 9/2000 | Ohmura et al. |
| 6,246,958 B1 | * | 6/2001 | Hirono .......................... 701/208 |
| 6,421,602 B1 | * | 7/2002 | Bullock et al. .............. 701/201 |
| 6,434,479 B1 | * | 8/2002 | Kondou et al. .............. 701/203 |
| 6,438,471 B1 | * | 8/2002 | Katagishi et al. ............. 701/33 |
| 2001/0018635 A1 | * | 8/2001 | Miyasaka et al. ........... 701/200 |
| 2001/0025222 A1 | | 9/2001 | Bechtolsheim et al. |
| 2001/0027375 A1 | * | 10/2001 | Machida et al. ............. 701/209 |
| 2001/0045965 A1 | * | 11/2001 | Orbanes et al. .............. 345/841 |
| 2001/0051973 A1 | * | 12/2001 | Green et al. ................. 709/201 |
| 2001/0051998 A1 | * | 12/2001 | Henderson ................... 709/217 |
| 2001/0054031 A1 | * | 12/2001 | Lee et al. ..................... 705/406 |
| 2002/0004704 A1 | * | 1/2002 | Nagatsuma et al. ......... 701/213 |
| 2002/0040271 A1 | * | 4/2002 | Park et al. .................... 701/209 |
| 2002/0156578 A1 | * | 10/2002 | Kondou et al. .............. 701/213 |
| 2002/0165664 A1 | * | 11/2002 | Park ............................. 701/209 |

FOREIGN PATENT DOCUMENTS

EP    1 063 494    12/2000

OTHER PUBLICATIONS

European Search Report for Application No. EP 02 25 6628 completed Nov. 13, 2003.

* cited by examiner

*Primary Examiner*—Thomas G. Black
*Assistant Examiner*—Tuan C To
(74) *Attorney, Agent, or Firm*—Sughrue Mion, PLLC

(57) ABSTRACT

The navigation system includes an information server apparatus, a terminal apparatus for conducting navigation processing while conducting communication with the information server apparatus, and a vehicle navigation apparatus mounted on a vehicle to conduct navigation processing independently of the information server apparatus. During execution of the navigation processing in the terminal apparatus, detection is effected to determine whether the vehicle navigation apparatus is started. Upon detecting that the vehicle navigation apparatus has been started, information for the navigation processing conducted until then is transferred to the vehicle navigation apparatus. The vehicle navigation apparatus conducts navigation processing by using the transferred information.

4 Claims, 5 Drawing Sheets

US 6,856,892 B2

NAVIGATION APPARATUS AND INFORMATION SERVER

BACKGROUND OF THE INVENTION

1. Field of the Invention

The present invention relates to a navigation system, a mobile navigation apparatus, a communication navigation apparatus and an information server apparatus, a navigation method, a mobile navigation method, a communication navigation method and a server processing method, a navigation program, a mobile navigation program, a communication navigation program and a server processing program, and an information recording medium. In particular, the present invention relates to a navigation system, a mobile navigation apparatus, a communication navigation apparatus and an information server apparatus, a navigation method, a mobile navigation method, a communication navigation method and a server processing method, a navigation program, a mobile navigation program, a communication navigation program and a server processing program, and an information recording medium, for conducting navigation processing of assisting movement of a mobile such as a vehicle while sending and receiving information via a mobile communication network.

2. Description of the Related Art

In recent years, there have been widely generalized vehicle-mounted navigation apparatuses for assisting a vehicle in traveling by displaying a map on a display such as a liquid crystal display panel mounted on the vehicle.

On the other hand, there have been recently advanced research and development concerning a technique for measuring distances between a portable terminal apparatus such as a portable telephone and a plurality of fixedly installed telephone base stations by using radio waves for communication, thereby acquiring the position of the terminal apparatus, and assisting a user having the terminal apparatus in traveling.

When the same owner owns the above described portable terminal apparatus and vehicle-mounted navigation apparatus, the following mode of use is conceivable. For example, when navigation processing is being executed by using the portable terminal apparatus, the owner gets into the vehicle and a navigation apparatus mounted on the vehicle takes over navigation processing executed in the portable terminal apparatus and continues the navigation processing.

However, the above described conventional portable terminal apparatus and the navigation apparatus mounted on the vehicle are formed to function separately and individually. In the case of the above described mode of use, therefore, it is necessary to set the portable terminal apparatus and the vehicle-mounted navigation apparatus separately and independently and set a desired destination and the like on the vehicle-mounted navigation apparatus completely newly. As a result, it takes unnecessary time to resume the navigation processing. Thus, there is a problem that the terminal apparatus and the vehicle-mounted navigation apparatus cannot be used practically and simply.

SUMMARY OF THE INVENTION

In view of the problem, the present invention has been made. An object of the present invention is to provide a navigation system, a mobile navigation apparatus, a communication navigation apparatus and an information server apparatus, a navigation method, a mobile navigation method, a communication navigation method and a server processing method, a navigation program, a mobile navigation program, a communication navigation program and a server processing program, and an information recording medium, which make it possible to use continuously a combination of a navigation apparatus mounted on a vehicle and a portable terminal apparatus more simply and practically.

The above object of the present invention can be achieved by a navigation system including an information server apparatus, a portable communication navigation apparatus for conducting navigation processing of assisting travel of a first mobile while conducting communication with the information server apparatus, and a mobile navigation apparatus for conducting navigation processing of assisting travel of a second mobile different from the first mobile independently of the information server apparatus while traveling together with the second mobile, the navigation system provided with: a detecting device which detects whether first one of the communication navigation apparatus and the mobile navigation apparatus is started during execution of the navigation processing in second one of the communication navigation apparatus and the mobile navigation apparatus; a transfer device responsive to detection that one of the communication navigation apparatus and the mobile navigation apparatus is started, which transfers information for the navigation processing used in the second one of the communication navigation apparatus and the mobile navigation apparatus that has been operated until then, from the second one to the first one; and a start device which starts the navigation processing in the first one by using the transferred information.

When first one of the communication navigation apparatus and the mobile navigation apparatus is started during execution of the navigation processing in second one of the communication navigation apparatus and the mobile navigation apparatus, therefore, information for the navigation processing used until then is transferred to the newly started apparatus and navigation processing is continuously executed. When the mobile navigation apparatus and the communication navigation apparatus are combined and used continuously, they can be used more simply and practically.

In one aspect of the navigation system of the present invention, the transferred information includes at least one of information for route search and information for indicating destination used in either navigation processing.

Therefore, information for route search or information for indicating destination is transferred to the newly started navigation apparatus. When a travel to one destination is effected while combining and continuously using the mobile navigation apparatus and the communication navigation apparatus, therefore, the necessary information can be transferred more simply.

In another aspect of the navigation system of the present invention, the transfer of the information is executed by radio.

Therefore, the transfer of the information required for switchover of the navigation apparatus is executed by radio. Accordingly, the information can be transferred more simply.

In further aspect of the navigation system of the present invention, the second mobile is a vehicle.

Therefore, the portable communication navigation apparatus and the vehicle-mounted mobile navigation apparatus can be combined and continuously used. Between the travel using the vehicle and the travel on foot, therefore, the navigation processing can be conducted effectively and continuously.

In further aspect of the navigation system of the present invention, the information server apparatus included in the navigation system provided with: a temporary stop request detecting device which detects whether a temporary stop request is received, the temporary stop request being transmitted from the communication navigation apparatus when the mobile navigation apparatus is started during execution of communication navigation processing, the communication navigation processing being the navigation processing conducted between the information server apparatus and the communication navigation apparatus, the temporary stop request indicating temporary stop of the communication navigation processing executed until then; a stop device responsive to reception of the temporary stop request, which temporarily stops the communication navigation processing and stores information used in the communication navigation processing executed until then; a resumption request detecting device which detects during temporary stop of the communication navigation processing whether a resumption request is received from the communication navigation apparatus, the resumption request indicating resumption of the communication navigation processing; and a resumption device responsive to reception of the resumption request, which resumes the communication navigation processing based on the resumption request and the stored information.

When the temporary stop request is issued by the communication navigation apparatus, therefore, the communication navigation processing in the information server itself is interrupted. When a resumption request is issued, the communication navigation processing is resumed on the basis of the resumption request and the stored information. When transferring the information between the communication navigation apparatus and the mobile navigation apparatus and continuing the navigation processing, therefore, the communication navigation processing can be stopped temporarily and resumed smoothly.

In further aspect of the navigation system of the present invention, the mobile navigation apparatus included in the navigation system provided with: the detecting device which detects whether the mobile navigation apparatus is started during execution of the navigation processing in the communication navigation apparatus; an acquisition device which acquires the information transferred from the communication navigation apparatus; and the start device which starts the navigation processing in the mobile navigation apparatus, by using the acquired information.

When the mobile navigation apparatus is started, therefore, the mobile navigation apparatus takes over the necessary information from the communication navigation apparatus and starts navigation processing as the mobile navigation apparatus. When navigation processing is continued from the communication navigation apparatus to the mobile navigation apparatus, therefore, the continuation processing can be conducted more simply and practically.

In further aspect of the navigation system of the present invention, the communication navigation apparatus included in the navigation system provided with: the detecting device which detects whether the communication navigation apparatus is started during execution of the navigation processing in the mobile navigation apparatus; an acquisition device which acquires the information transferred from the mobile navigation apparatus; and the start device which starts the navigation processing in the communication navigation apparatus, by using the acquired information.

When the communication navigation apparatus is started, therefore, the communication navigation apparatus takes over the necessary information from the mobile navigation apparatus and starts navigation processing as the communication navigation apparatus. When navigation processing is continued from the mobile navigation apparatus to the communication navigation apparatus, the continuation processing can be conducted more simply and practically.

The above object of the present invention can be achieved by a navigation method executed in a navigation system, the navigation system including an information server apparatus, a portable communication navigation apparatus for conducting navigation processing of assisting travel of a first mobile while conducting communication with the information server apparatus, and a mobile navigation apparatus for conducting navigation processing of assisting travel of a second mobile different from the first mobile independently of the information server apparatus while traveling together with the second mobile, the navigation method provided with: a detecting process of detecting whether first one of the communication navigation apparatus and the mobile navigation apparatus is started during execution of the navigation processing in second one of the communication navigation apparatus and the mobile navigation apparatus; a transfer process, responsive to detection that one of the communication navigation apparatus and the mobile navigation apparatus is started, of transferring information for the navigation processing used in the second one of the communication navigation apparatus and the mobile navigation apparatus that has been operated until then, from the second one to the first one; and a start process of starting the navigation processing in the first one by using the transferred information.

When first one of the communication navigation apparatus and the mobile navigation apparatus is started during execution of the navigation processing in second one of the communication navigation apparatus and the mobile navigation apparatus, therefore, information for the navigation processing used until then is transferred to the newly started apparatus and navigation processing is continuously executed. When the mobile navigation apparatus and the communication navigation apparatus are combined and used continuously, they can be used more simply and practically.

In one aspect of the navigation method of the present invention, the transferred information includes at least one of information for route search and information for indicating destination used in either navigation processing.

Therefore, information for route search or information for indicating destination is transferred to the newly started navigation apparatus. When a travel to one destination is effected while combining and continuously using the mobile navigation apparatus and the communication navigation apparatus, therefore, the necessary information can be transferred more simply.

In another aspect of the navigation method of the present invention, the transfer process is executed by radio.

Therefore, the transfer of the information required for switchover of the navigation apparatus is executed by radio. Accordingly, the information can be transferred more simply.

In further aspect of the navigation method of the present invention, the second mobile is a vehicle.

Therefore, the portable communication navigation apparatus and the vehicle-mounted mobile navigation apparatus can be combined and continuously used. Between the travel using the vehicle and the travel on foot, therefore, the navigation processing can be conducted effectively and continuously.

In further aspect of the navigation method of the present invention, a server processing method executed in the information server apparatus included in the navigation system using the navigation method provided with: a temporary stop request detecting process of detecting whether a temporary stop request is received, the temporary stop request being transmitted from the communication navigation apparatus when the mobile navigation apparatus is started during execution of communication navigation processing, the communication navigation processing being the navigation processing conducted between the information server apparatus and the communication navigation apparatus, the temporary stop request indicating temporary stop of the communication navigation processing executed until then; a stop process, responsive to reception of the temporary stop request, of temporarily stopping the communication navigation processing and storing information used in the communication navigation processing executed until then; a resumption request detecting process of detecting during temporary stop of the communication navigation processing whether a resumption request is received from the communication navigation apparatus, the resumption request indicating resumption of the communication navigation processing; and a resumption process, responsive to reception of the resumption request, of resuming the communication navigation processing based on the resumption request and the stored information.

When the temporary stop request is issued by the communication navigation apparatus, therefore, the communication navigation processing in the information server itself is interrupted. When a resumption request is issued, the communication navigation processing is resumed on the basis of the resumption request and the stored information. When transferring the information between the communication navigation apparatus and the mobile navigation apparatus and continuing the navigation processing, therefore, the communication navigation processing can be stopped temporarily and resumed smoothly.

In further aspect of the navigation method of the present invention, a mobile navigation method executed in the mobile navigation apparatus included in the navigation system using the navigation method provided with: the detecting process of detecting whether the mobile navigation apparatus is started during execution of the navigation processing in the communication navigation apparatus; an acquisition process of acquiring the information transferred from the communication navigation apparatus; and the start process of starting the navigation processing in the mobile navigation apparatus, by using the acquired information.

When the mobile navigation apparatus is started, therefore, the mobile navigation apparatus takes over the necessary information from the communication navigation apparatus and starts navigation processing as the mobile navigation apparatus. When navigation processing is continued from the communication navigation apparatus to the mobile navigation apparatus, therefore, the continuation processing can be conducted more simply and practically.

In further aspect of the navigation method of the present invention, a communication navigation method executed in the communication navigation apparatus included in the navigation system using the navigation method provided with: the detecting process of detecting whether the communication navigation apparatus is started during execution of the navigation processing in the mobile navigation apparatus; an acquisition process of acquiring the information transferred from the mobile navigation apparatus; and the start process for starting the navigation processing in the communication navigation apparatus, by using the acquired information.

When the communication navigation apparatus is started, therefore, the communication navigation apparatus takes over the necessary information from the mobile navigation apparatus and starts navigation processing as the communication navigation apparatus. When navigation processing is continued from the mobile navigation apparatus to the communication navigation apparatus, the continuation processing can be conducted more simply and practically.

The above object of the present invention can be achieved by a navigation program for computers included in a navigation system, the navigation system including an information server apparatus, a portable communication navigation apparatus for conducting navigation processing of assisting travel of a first mobile while conducting communication with the information server apparatus, and a mobile navigation apparatus for conducting navigation processing of assisting travel of a second mobile different from the first mobile independently of the information server apparatus while traveling together with the second mobile, the navigation program making the computers function as: a detecting device which detects whether first one of the communication navigation apparatus and the mobile navigation apparatus is started during execution of the navigation processing in second one of the communication navigation apparatus and the mobile navigation apparatus; a transfer device responsive to detection that one of the communication navigation apparatus and the mobile navigation apparatus is started, which transfers information for the navigation processing used in the second one of the communication navigation apparatus and the mobile navigation apparatus that has been operated until then, from the second one to the first one; and a start device which starts the navigation processing in the first one by using the transferred information.

When first one of the communication navigation apparatus and the mobile navigation apparatus is started during execution of the navigation processing in second one of the communication navigation apparatus and the mobile navigation apparatus, therefore, the computers function to transfer information for the navigation processing used until then to the newly started apparatus and continuously executing navigation processing. When the mobile navigation apparatus and the communication navigation apparatus are combined and used continuously, they can be used more simply and practically.

In one aspect of the navigation program of the present invention, the transferred information includes at least one of information for route search and information for indicating destination used in either navigation processing.

Therefore, the computers function to transfer information for route search or information for indicating destination to the newly started navigation apparatus. When a travel to one destination is effected while combining and continuously using the mobile navigation apparatus and the communication navigation apparatus, therefore, the necessary information can be transferred more simply.

In another aspect of the navigation program of the present invention, the computer functioning as the transfer device is made to execute the transfer of the information by radio.

Therefore, the computers function to execute the transfer of the information required for switchover of the navigation apparatus by radio. Accordingly, the information can be transferred more simply.

In further aspect of the navigation program of the present invention, the second mobile is a vehicle.

Therefore, the computers function to combine and continuously use the portable communication navigation apparatus and the vehicle-mounted mobile navigation apparatus. Between the travel using the vehicle and the travel on foot, therefore, the navigation processing can be conducted effectively and continuously.

In further aspect of the navigation program of the present invention, a server processing program for a server computer included in the information server apparatus which is included in the navigation system using the navigation program making the server computer as: a temporary stop request detecting device which detects whether a temporary stop request is received, the temporary stop request being transmitted from the communication navigation apparatus when the mobile navigation apparatus is started during execution of communication navigation processing, the communication navigation processing being the navigation processing conducted between the information server apparatus and the communication navigation apparatus, the temporary stop request indicating temporary stop of the communication navigation processing executed until then; a stop device responsive to reception of the temporary stop request, which temporarily stops the communication navigation processing and stores information used in the communication navigation processing executed until then; a resumption request detecting device which detects during temporary stop of the communication navigation processing whether a resumption request is received from the communication navigation apparatus, the resumption request indicating resumption of the communication navigation processing; and a resumption device responsive to reception of the resumption request, which resumes the communication navigation processing based on the resumption request and the stored information.

When the temporary stop request is issued by the communication navigation apparatus, therefore, the server computer functions to interrupt the communication navigation processing in the information server itself. When a resumption request is issued, the server computer functions to resume the communication navigation processing on the basis of the resumption request and the stored information. When transferring the information between the communication navigation apparatus and the mobile navigation apparatus and continuing the navigation processing, therefore, the communication navigation processing can be stopped temporarily and resumed smoothly.

In further aspect of the navigation program of the present invention, a mobile navigation program for a mobile computer included in the mobile navigation apparatus which is included in the navigation system using the navigation program making the mobile computer as: the detecting device which detects whether the mobile navigation apparatus is started during execution of the navigation processing in the communication navigation apparatus; an acquisition device which acquires the information transferred from the communication navigation apparatus; and the start device which starts the navigation processing in the mobile navigation apparatus, by using the acquired information.

When the mobile navigation apparatus is started, therefore, the mobile computer functions so that the mobile navigation apparatus will take over the necessary information from the communication navigation apparatus and start navigation processing as the mobile navigation apparatus. When navigation processing is continued from the communication navigation apparatus to the mobile navigation apparatus, therefore, the continuation processing can be conducted more simply and practically.

In further aspect of the navigation program of the present invention, a communication navigation program for a communication computer included in the communication navigation apparatus which is included in the navigation system using the navigation program making the communication computer as: the detecting device which detects whether the communication navigation apparatus is started during execution of the navigation processing in the mobile navigation apparatus; an acquisition device which acquires the information transferred from the mobile navigation apparatus; and the start device which starts the navigation processing in the communication navigation apparatus, by using the acquired information.

When the communication navigation apparatus is started, therefore, the communication computer functions so that the communication navigation apparatus will take over the necessary information from the mobile navigation apparatus and start navigation processing as the communication navigation apparatus. When navigation processing is continued from the mobile navigation apparatus to the communication navigation apparatus, the continuation processing can be conducted more simply and practically.

The above object of the present invention can be achieved by an information recording medium storing the navigation program so as to be able to be read by the computer.

When a navigation program according to a fifteenth aspect is stored, the navigation program is read out and executed by the computer. When first one of the communication navigation apparatus and the mobile navigation apparatus is started during execution of the navigation processing in second one of the communication navigation apparatus and the mobile navigation apparatus, therefore, the computer functions to transfer information for the navigation processing used until then to the newly started apparatus and continuously executing navigation processing. When the mobile navigation apparatus and the communication navigation apparatus are combined and used continuously, they can be used more simply and practically.

When a navigation program according to a sixteenth aspect is stored, the navigation program is read out and executed by the computer. Therefore, the computer functions to transfer information for route search or information for indicating destination to the newly started navigation apparatus. When a travel to one destination is effected while combining and continuously using the mobile navigation apparatus and the communication navigation apparatus, therefore, the necessary information can be transferred more simply.

When a navigation program according to a seventeenth aspect is stored, the navigation program is read out and executed by the computer. Therefore, the computer functions to execute the transfer of the information required for switchover of the navigation apparatus by radio. Accordingly, the information can be transferred more simply.

When a navigation program according to an eighteenth aspect is stored, the navigation program is read out and executed by the computer. Therefore, the computer functions to combine and continuously use the portable communication navigation apparatus and the vehicle-mounted mobile navigation apparatus. Between the travel using the vehicle and the travel on foot, therefore, the navigation processing can be conducted effectively and continuously.

The above object of the present invention can be achieved by an information recording medium storing the server processing program so as to be able to be read by the server computer.

The server processing program is read out and executed by the server computer. When the temporary stop request is issued by the communication navigation apparatus, therefore, the server computer functions to interrupt the communication navigation processing in the information server itself. When a resumption request is issued, the server computer functions to resume the communication navigation processing on the basis of the resumption request and the stored information. When transferring the information between the communication navigation apparatus and the mobile navigation apparatus and continuing the navigation processing, therefore, the communication navigation processing can be stopped temporarily and resumed smoothly.

The above object of the present invention can be achieved by an information recording medium storing the mobile navigation program so as to be able to be read by the mobile computer.

The mobile navigation program is read out and executed by the mobile computer. When the mobile navigation apparatus is started, therefore, the mobile computer functions so that the mobile navigation apparatus will take over the necessary information from the communication navigation apparatus and start navigation processing as the mobile navigation apparatus. When navigation processing is continued from the communication navigation apparatus to the mobile navigation apparatus, therefore, the continuation processing can be conducted more simply and practically.

The above object of the present invention can be achieved by an information recording medium storing the communication navigation program so as to be able to be read by the communication computer.

The communication navigation program is read out and executed by the communication computer. When the communication navigation apparatus is started, therefore, the communication computer functions so that the communication navigation apparatus will take over the necessary information from the mobile navigation apparatus and start navigation processing as the communication navigation apparatus. When navigation processing is continued from the mobile navigation apparatus to the communication navigation apparatus, the continuation processing can be conducted more simply and practically.

DESCRIPTION OF THE PREFERRED EMBODIMENTS

Preferred embodiments of the present invention will now be described with reference to the drawings.

The embodiments hereafter described are embodiments in the case where the present invention is applied to a navigation system including an information server apparatus that executes route search processing, storage and delivery of map information, and storage and delivery of spot information required for execution of navigation processing for a portable terminal apparatus described later, the portable terminal apparatus that is connected to the information server apparatus via a mobile communication network to receive a search result obtained as a result of the route search processing and map information delivered from the information server apparatus and conduct navigation processing for an owner who owns the portable terminal apparatus, and a vehicle navigation apparatus that functions independently of the information server apparatus and executes navigation processing for a vehicle mounting the vehicle navigation apparatus.

Figure 1:
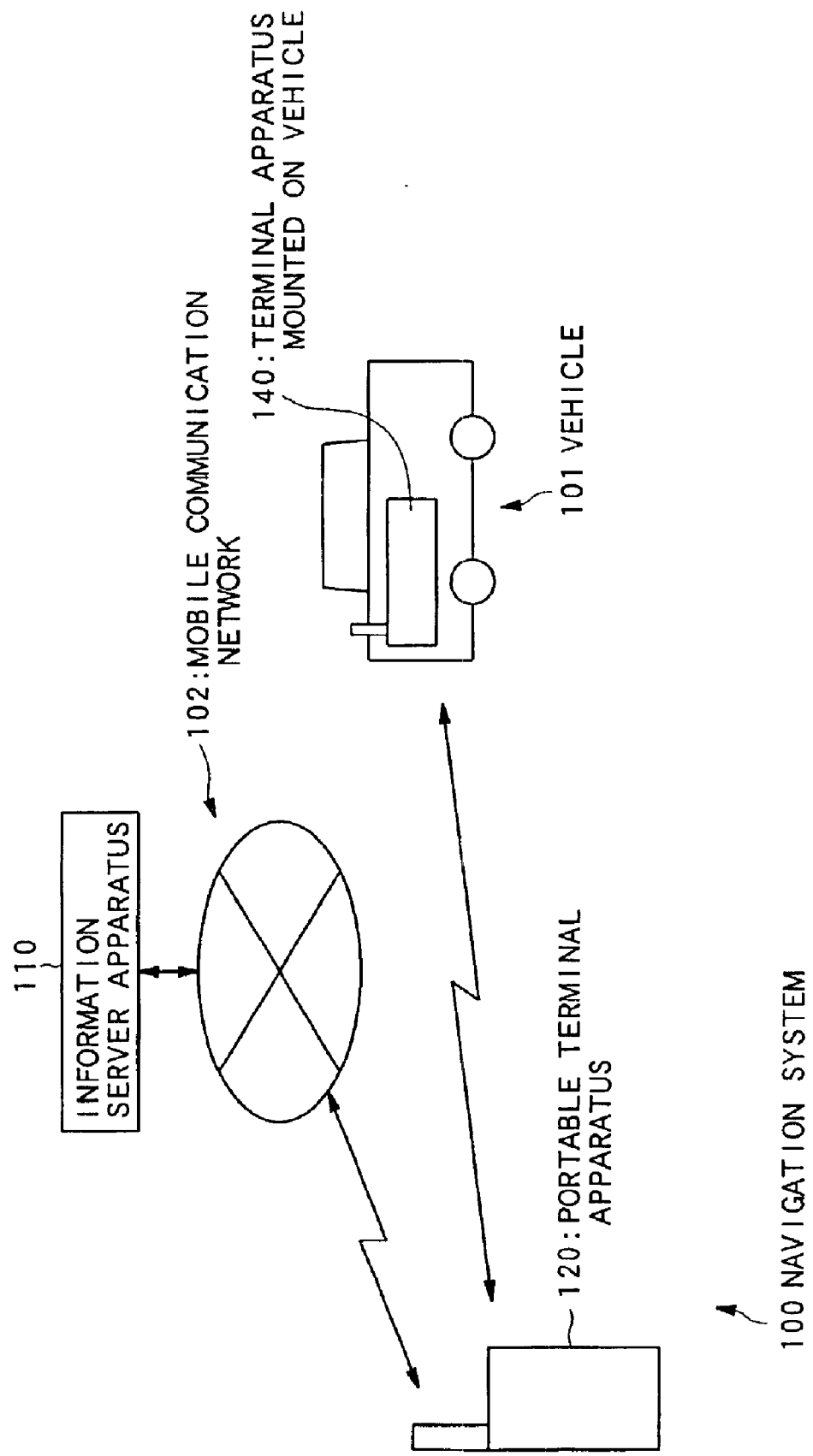
FIG. 1 is a block diagram showing a schematic configuration of a navigation system in an embodiment of the present invention.

First, a schematic configuration and operation of a navigation system in the embodiment will now be described with reference to FIG. 1. FIG. 1 is a block diagram showing a schematic configuration of a navigation system according to the present embodiment.

As shown in FIG. 1, a navigation system 100 of the embodiment includes an information server apparatus 110 for conducting route search processing required for navigation processing in the terminal apparatus, the terminal apparatus 120, and a vehicle navigation apparatus 140 mounted on a vehicle 101 serving as a mobile. Only the information server apparatus 110 and the terminal apparatus 120 are connected to each other by a mobile communication network 102 such as a public telephone network or the Internet. The terminal apparatus 120 is connected to the mobile communication network 102 via, for example, a base station, which is not illustrated.

In the configuration shown in FIG. 1, the information server apparatus 110 is installed fixedly in a preset spot. The information server apparatus 110 acquires position information, which indicates a current position of an owner who owns the terminal apparatus 120, and travel information (hereafter referred to as mobile data) concerning a travel direction of the terminal apparatus 120, and conducts various kinds of processing required for navigation processing in the terminal apparatus 120.

The terminal apparatus 120 conducts delivery and receipt of the search result with the information server apparatus 110, and guides the owner who owns the terminal apparatus 120.

More specifically, the terminal apparatus 120 transmits destination information inputted in an operation section, which is included in the terminal apparatus 120 and which is not illustrated, and mobile data such as position information indicating a current position of the terminal apparatus 120 acquired on the basis of communication with a fixed base station, which is not illustrated, traveling direction information and traveling velocity information, to the information server apparatus 110. In addition, the terminal apparatus 120 receives data (hereafter referred to as navigation data) processed in the information server apparatus 110 on the basis of those mobile data, such as result information of route search and route guiding information. Thereby, the terminal apparatus 120 conducts navigation processing for the owner.

On the other hand, the vehicle navigation apparatus 140 conducts navigation processing for the vehicle 101 independently of the information server apparatus 110, on the basis of destination information inputted on the vehicle navigation apparatus 140, position information of the vehicle's position acquired by receiving GPS (Global Positioning System) data, and vehicle travel data calculated on the basis of outputs of a vehicle velocity pulse output section, an acceleration sensor, a vibration sensor, and a gyro sensor.

Furthermore, in the navigation system 100 of the present embodiment, the terminal apparatus 120 and the vehicle navigation apparatus 140 can be radio-connected to each other by means of short-distance radio communication, more specifically, for example, communication according to so-called Bluetooth (trade mark of Telefonaktiebolaget L M Ericsson) standards, which is now being created as IEEE (Institute of Electrical and Electronic Engineers) 802.15 standards.

Detailed configurations of the information server apparatus 110, the terminal apparatus 120, and the vehicle navigation apparatus 140 will now be described with reference to FIGS. 2 to 4.

Figure 2:
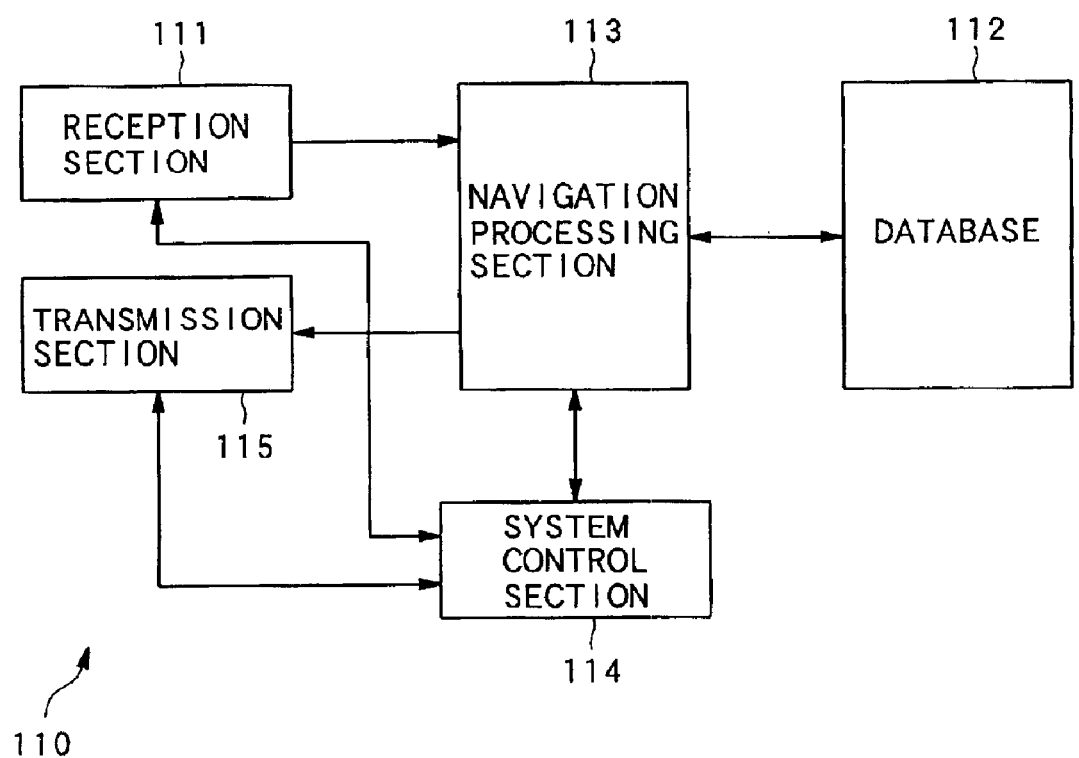
FIG. 2 is a block diagram showing a configuration of an information server apparatus in an embodiment of the present invention.

FIG. 2 is a block diagram showing a detailed configuration of the information server apparatus 110. FIG. 3 is a block diagram showing a detailed configuration of the terminal apparatus 120. FIG. 4 is a block diagram showing a detailed configuration of the vehicle navigation apparatus 140.

First, the detailed configuration of the information server apparatus 110 will now be described with reference to FIG. 2.

As shown in FIG. 2, the information server apparatus 110 includes a reception section 111 for receiving mobile data transmitted from the terminal apparatus 120 via the mobile communication network 102, a navigation processing section 113 for conducting processing required for navigation processing in the terminal apparatus 120 by using received mobile data and map information stored in a database 112, a system control section 114 for controlling respective sections in the information server apparatus 110, controlling processing of connecting with the terminal apparatus 120 on the basis of received mobile data, and serving as a temporary stop request detection device, a stop device, a resumption request detection device, and a resumption device, and a transmission section 115 for transmitting navigation data and connection processing control data to the terminal apparatus 120.

At this time, the reception section 111 receives mobile data and destination information from the terminal apparatus 120 via the mobile communication network 102, and outputs the received mobile data to the navigation processing section 113.

On the other hand, the database 112 is connected to the navigation processing section 113. Road information, such as map information and traffic jam information, and additional information, such as store information and parking information, are stored in the database 112. In addition, destination information set by navigation processing executed between the terminal apparatus 120 and the information server apparatus 110, and route information set on the basis of the destination information are stored, every owner who owns the terminal apparatus 120, in the database 112.

The database 112 retrieves these various data in accordance with an order from the navigation processing section 113. The database 112 outputs a result of the retrieval to the navigation processing section 113.

Various data stored in the database 112 are updated as occasion demands by an input section, which is not illustrated, in the information server apparatus 110.

On the other hand, the navigation processing section 113 conducts various kinds of processing required as the information server apparatus 110 on the basis of an order from the system control section 114.

Specifically, the navigation processing section 113 retrieves in the database 112 on the basis of received mobile data, acquires necessary data, and conducts processing required for navigation processing in the terminal apparatus 120, such as route search processing and route guide processing for an owner who owns the terminal apparatus 120. The navigation processing section 113 transmits the corresponding route search result and navigation data concerning the route guide to the terminal apparatus 120 via the transmission section 115.

The system control section 114 controls respective sections included in the information server apparatus 110, i.e., the reception section 111, the navigation processing section 113, and the transmission section 115. In addition, the system control section 114 controls communication with the terminal apparatus 120.

On the other hand, the transmission section 115 transmits navigation data outputted from the navigation processing section 113 and the system control section 114 to the terminal apparatus 120 on the basis of an order from the system control section 114.

A configuration of the terminal apparatus 120 will now be described with reference to FIG. 3.

Figure 3:
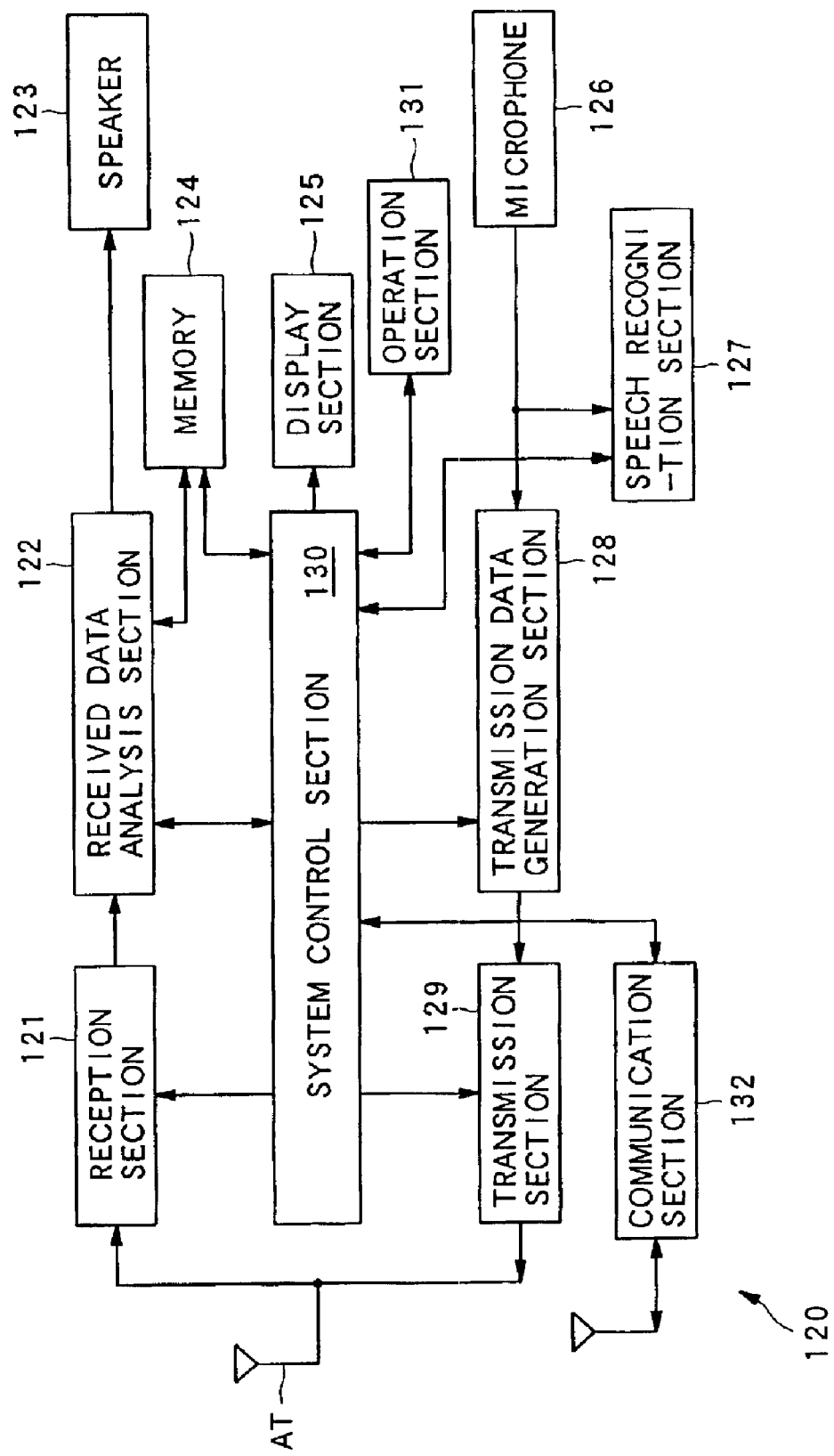
FIG. 3 is a block diagram showing a configuration of a terminal apparatus in an embodiment of the present invention.

As shown in FIG. 3, the terminal apparatus 120 includes a reception section 121 connected to an antenna AT to receive communication data including speech data such as talk, a received data analysis section 122 for analyzing the data kind and outputting the result to predetermined sections, a speaker 123 for emitting received voice data, a memory 124 for storing received data, a display section 125 for displaying received data, a microphone 126 for inputting speech, a speech recognition section 127 for recognizing inputted speech, a transmission data generation section 128 for generating transmission data on the basis of inputted speech, a transmission section 129 for transmitting the transmission data to the information server apparatus 110, a system control section 130 for controlling respective sections on the basis of the received data and the data stored in the memory 124, and for controlling processing of connection with the terminal apparatus 120 and the vehicle navigation apparatus 140 on the basis of these data, which serves as a detection device and as a travel device, an operation section 131 for operating respective sections, and a communication section 132 for conducting radio communication with the vehicle navigation apparatus 140 in conformity with the Bluetooth standards.

An address in the Bluetooth standards (hereafter referred to as BT address) is previously set in the communication section 132.

Typically, according to the Bluetooth standards, communication apparatuses conforming to them form a link called piconet (one piconet basically includes one master apparatus and a plurality of slave apparatuses) and thereby conduct radio communication. A connection procedure for forming the piconet includes an inquiry process and a paging process. At the inquiry process, the master apparatus determines whether another apparatus capable of conducting communication conforming to the Bluetooth standards exists in a communication range of the master apparatus. At the paging process, the master apparatus acquires a BT address from a slave apparatus and establishes a communication ready state.

In the embodiment, the vehicle navigation apparatus 140 described later is previously set as the master apparatus, and the vehicle navigation apparatus 140 forms the piconet with the terminal apparatus 120 by omitting the inquiry process (i.e., using only the paging process) and conducts delivery and receipt of search information described later.

A configuration of the vehicle navigation apparatus 140 will now be described with reference to FIG. 4.

Figure 4:
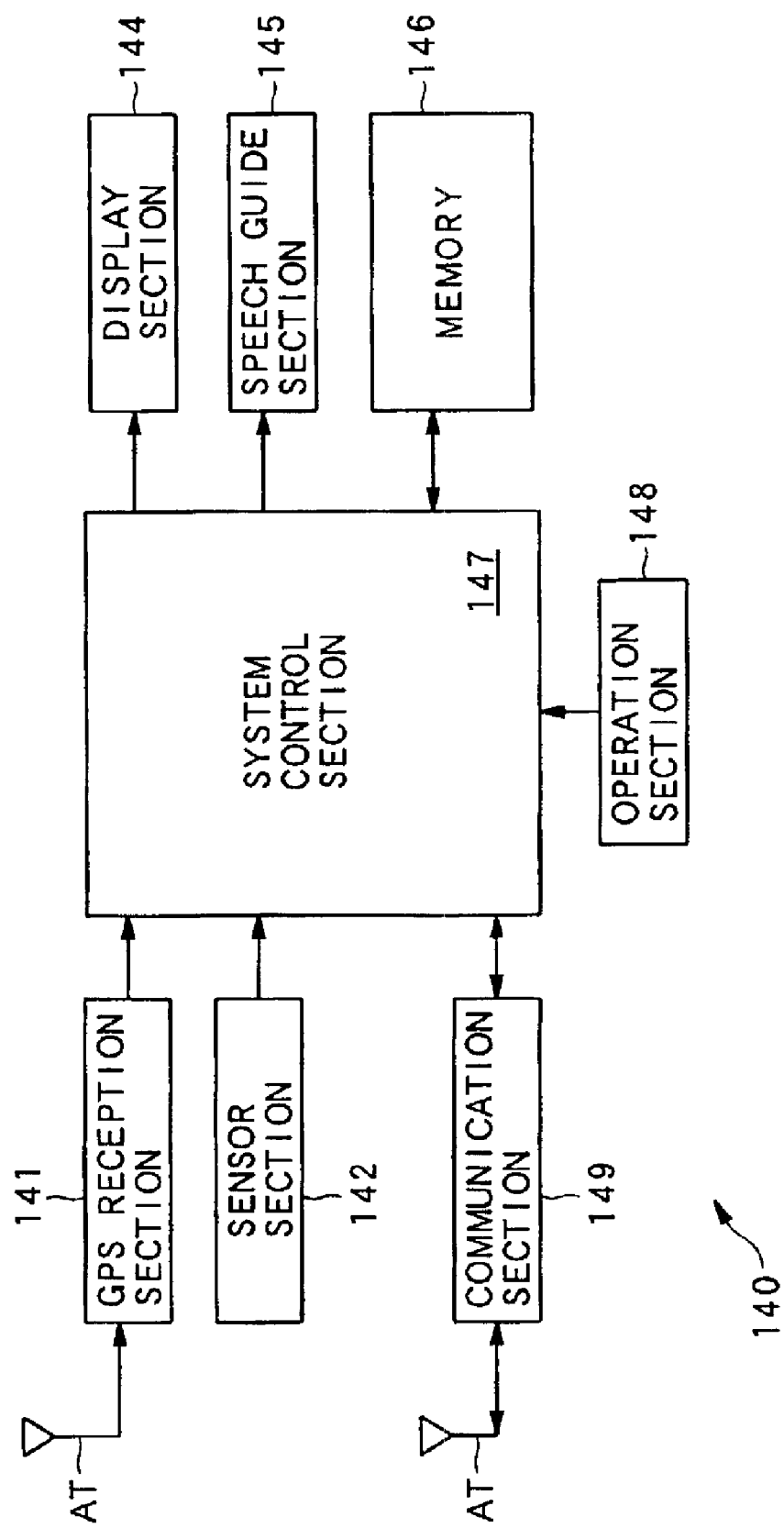
FIG. 4 is a block diagram showing a configuration of a vehicle navigation apparatus in an embodiment of the present invention.

As shown in FIG. 4, the vehicle navigation apparatus 140 includes a GPS reception section 141 connected to an antenna AT to receive GPS data, a sensor section 142 including a velocity & acceleration sensor for sensing the travel velocity and acceleration of the vehicle and an azimuth sensor for sensing an azimuth of the vehicle, a display section 144 for displaying navigation data together with map information, a speech guide section 145 for conducting route guide of the vehicle by using speech on the basis of received navigation data, a memory 146 for temporarily storing received data such as navigation data, a system control section 147 which serves as a start device, for controlling the display section 144 and the speech guide section 145 on the basis of received data or data stored in the memory 146, an operation section 148 for operating respective sections, and a communication section 149 connected to an antenna AT to conduct radio communication with the terminal apparatus 120 in conformity with the Bluetooth standards.

In the same way as the communication section 132 in the terminal apparatus 120, a BT address is previously set in the communication section 149. In addition, the BT address is set in the master apparatus in the Bluetooth standards.

Navigation processing according to the present embodiment executed in the navigation system 100 having the above described configuration will now be described with reference to FIG. 5.

Figure 5:
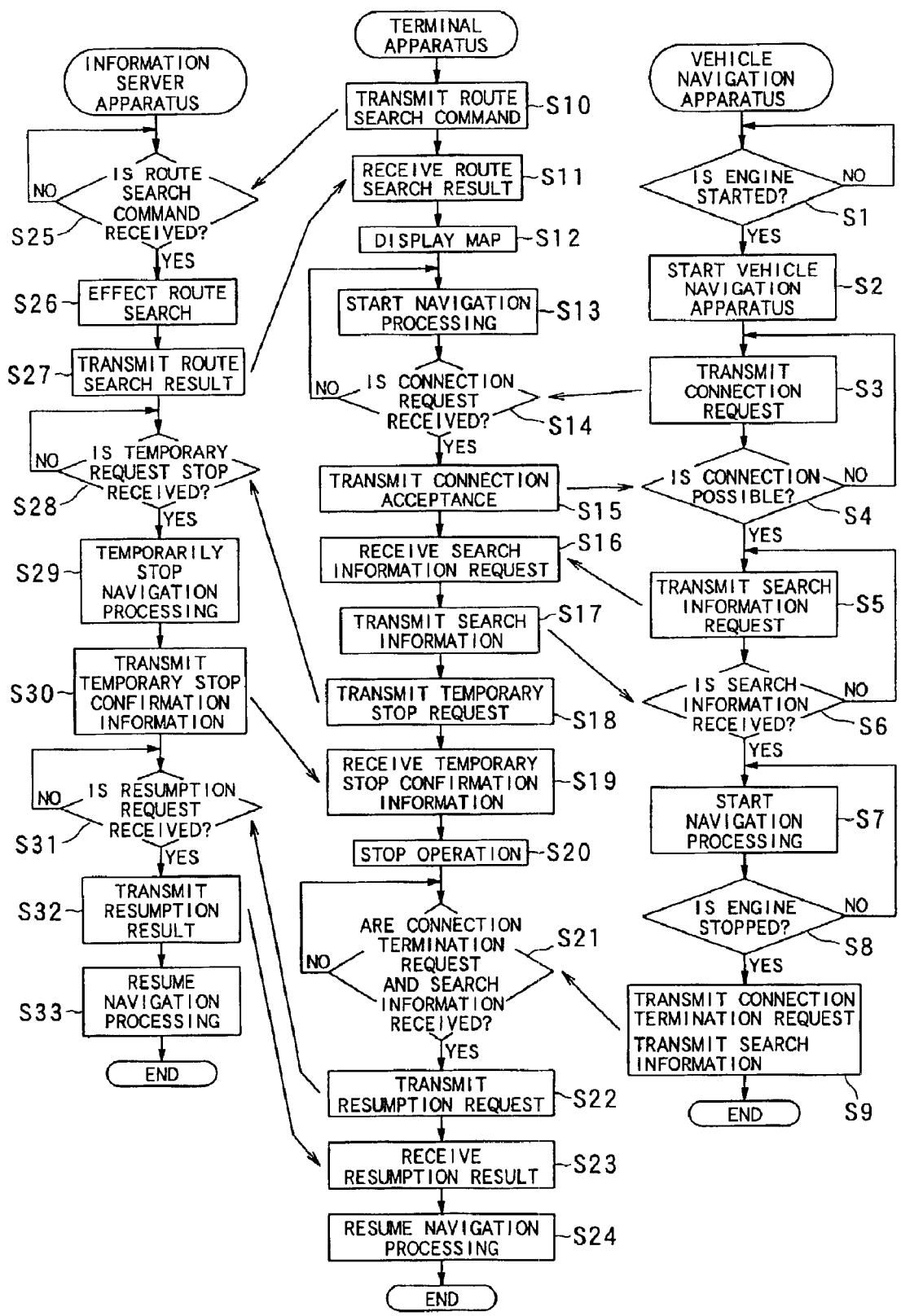
FIG. 5 is a flow chart showing navigation processing in an embodiment of the present invention.

FIG. 5 is a flow chart collectively showing processing executed in respective components showing in FIG. 1 as the navigation processing.

The ensuing embodiment will be described for the following case. First, route guide serving as navigation processing is executed for the owner who owns the terminal apparatus 120 while delivery and receipt of information are being conducted, between the terminal apparatus 120 and the information server apparatus 110. Thereafter, the owner gets into the vehicle 101 owned by the owner. Then, the vehicle navigation apparatus 140 mounted on the vehicle 101 continuously executes navigation processing. Then, the owner gets out of the vehicle 101 in the vicinity of destination. Navigation processing using the terminal apparatus 120 is conducted again.

In navigation processing according to the embodiment as shown in FIG. 5, the terminal apparatus 120 first transmits a route search command to the information server apparatus 110 in order to search for a route for guiding the owner to destination (step S10). At this time, the route search command contains information concerning the current position of the owner who owns the terminal apparatus 120 and destination information set in the terminal apparatus 120.

The route search command previously contains information indicating whether the owner travels by using the vehicle 101 owned by the owner or the owner travels by using, for example, public transport facilities without using his own vehicle. When the route search command contains information indicating that the owner should arrive at the destination without using his own vehicle 101, route search processing (step S26) described later is executed without considering the position of his own vehicle 101 at all. On the other hand, when the route search command contains information indicating that the owner should arrive at the destination by using his own vehicle 101, the route search processing is executed considering navigation processing as far as the position of the vehicle 101 and navigation processing after the owner gets out of the vehicle 101.

On the other hand, the information server apparatus 110 always monitors to determine whether the route search command has been received (step S25). When the route search command has not been received (step S25; NO), the information server apparatus 110 continues the monitoring. On the other hand, when the route search command has been received (step S25; YES), the information server apparatus 110 conducts necessary route search processing by using destination information and current position information in the received route search command (step S26), and transmits a result of the route search processing to the terminal apparatus 120 as a route search result (step S27). At this time, the search content differs depending upon the information indicating whether the vehicle 101 is used in the travel.

After the transmission of the route search result, the information server apparatus 110 waits while monitoring to determine whether a temporary stop request described later is transmitted from the terminal apparatus 120 (step S28).

Upon receiving the transmitted route search result (step S11), the terminal apparatus 120 displays the map including a route contained in the received route search result on the display section 125 in the terminal apparatus 120 (step S12), and conducts necessary navigation processing including route guide processing for the owner by using the map (step S13).

On the other hand, the vehicle navigation apparatus 140 on the vehicle 101 always monitors to determine whether an engine of the vehicle 101 is started (step S1). When the engine is not started (Step S1; NO), the vehicle navigation apparatus 140 continues to wait.

On the other hand, in the case where the first route search command (see the description of the step S10) contains information indicating that the owner travels to the destination by using the vehicle 101, the owner arrives at his own vehicle owing to the navigation processing conducted by the information server apparatus 110 and the terminal apparatus 120, and gets into the vehicle 101. When the owner starts the engine (step S1; YES), the vehicle navigation apparatus 140 itself is started (step S2) and then the vehicle navigation apparatus 140 transmits a connection request for requesting establishment of radio connection (in conformity with the Bluetooth standards) with the vehicle navigation apparatus 140, to the terminal apparatus 120 owned by the owner who is on the vehicle (step S3).

During execution of the navigation processing with the information server apparatus 110, the terminal apparatus 120 always monitors to determine whether the connection request receives (step S14). When the connection request is not received (step S14; NO), the terminal apparatus 120 continues the navigation processing with the information server apparatus 110. On the other hand, when the connection request is received (step S14; YES), the terminal apparatus 120 then transmits connection acceptance information that the establishment of the radio connection is accepted, to the vehicle navigation apparatus 140 (step S15).

The vehicle navigation apparatus 140 always monitors to determine whether the connection acceptance information which should be transmitted is received (step S4). When the connection acceptance information is not received (step S4; NO), the vehicle navigation apparatus 140 regards the radio connection as impossible and returns to the processing of the step S3 to transmit the connection request again. On the other hand, when the connection acceptance information is received (step S4; YES), the vehicle navigation apparatus 140 then transmits a search information request to the terminal apparatus 120 in order to request the terminal apparatus 120 to transfer search information including the route search result used in the navigation processing which was executed until then by using the terminal apparatus 120, to the vehicle navigation apparatus 140 (step S5).

Upon receiving the search information request (step S16), the terminal apparatus 120 transmits the necessary route search result to the vehicle navigation apparatus 140 on the basis of the received search information request (step S17), and transmits a temporary stop request that the navigation processing between the information server apparatus 110 and the terminal apparatus 120 is temporarily interrupted, to the information server apparatus 110 (step S18).

On the other hand, the information server apparatus 110 monitors transmission of the temporary stop request (step S28). While the temporary stop request is not received (step S28; NO), the information server apparatus 110 continues to wait. On the other hand, when the temporary stop request is received (step S28; YES), the information server apparatus 110 temporarily stops the navigation processing which has been executed until then with the terminal apparatus 120 (step S29), and transmits temporary stop confirmation information that the navigation processing is stopped, to the terminal apparatus 120 (step S30). Thereafter, the information server apparatus 110 waits while always monitoring to determine whether a navigation processing resumption request described later is received from the terminal apparatus 120 (step S31).

During the waiting, the information server apparatus 110 stores the destination information and route information used in the navigation processing which has been executed with the terminal apparatus 120 until the temporary stop (i.e., destination information specialized to the owner who owns the terminal apparatus 120) in the database 112.

Upon receiving the temporary stop confirmation information from the information server apparatus 110 (step S19), the terminal apparatus 120 temporarily stops the navigation processing (step S20), and waits while monitoring to determine whether a connection termination request described later is received from the vehicle navigation apparatus 140 (step S21).

After the transmission of the search information request (step S5), the vehicle navigation apparatus 140 always monitors to determine whether the necessary search information from the terminal apparatus 120 is received in the communication section 149 (step S6). When the search information is not received (step S6; NO), the vehicle navigation apparatus 140 returns to the step S5 to transmit the search information request again. On the other hand, when the search information is received (step S6; YES), the vehicle navigation apparatus 140 executes necessary navigation processing by using the received search information (step S7).

During the execution of the navigation processing (step S7), the vehicle navigation apparatus 140 always monitors to determine whether the engine of the vehicle 101 is stopped (step S8). When the engine is not stopped (step S8; NO), the vehicle navigation apparatus 140 continues the navigation processing (step S7). When the engine is stopped (step S8; YES), the vehicle navigation apparatus 140 supposes that the owner who arrives at vicinity of the destination by using the vehicle 101 gets out of the vehicle 101 and continuously resumes the navigation processing using the terminal apparatus 120 to arrive at the final destination, returns a connection termination request that the current connection should be disconnected, to the terminal apparatus 120 (step S9), and terminates the processing of the vehicle navigation apparatus 140 according to the embodiment.

On the other hand, the terminal apparatus 120 monitors the transmission of the search termination request (step S21). When the search termination request is not received (step S21; NO), the terminal apparatus 120 continues to wait. On the other hand, when the search termination request is received (step S21; YES), the terminal apparatus 120 then transmits a resumption request that the navigation processing with the information server apparatus 110 should be resumed, to the information server apparatus 110 (step S22).

The information server apparatus 110 monitors transmission of the resumption request (step S31). While the resumption request is not received (step S31; NO), the information server apparatus 110 continues to wait. On the other hand, when the resumption request has been received (step S31; YES), the information server apparatus 110 transmits a resumption result that the navigation processing including the route guide with the terminal apparatus 120 will be resumed by using the destination information and the route information of every owner, which has been stored in the database 112 during the waiting of the step S31, to the terminal apparatus 120 (step S32). Thereafter, the information server apparatus 110 executes navigation processing with the terminal apparatus 120 as far as the final destination by using the stored destination information and the route information and the position information regarding the terminal apparatus 120 at the time of reception of the resumption result (step S33), and terminates the processing according to the embodiment.

On the other hand, upon receiving the resumption request (step S23), the terminal apparatus 120 executes the navigation processing with the information server apparatus 110 as far as the final destination (step S24), and then terminates the processing according to the embodiment.

The operation of the navigation system of the embodiment has heretofore been described. When the vehicle navigation apparatus 140 is started during execution of the navigation processing in the information server apparatus 110 and the terminal apparatus 120, the search information used for the navigation processing until then is transferred to the newly started vehicle navigation apparatus 140 and the navigation processing is continuously executed. When the vehicle navigation apparatus 140 and the terminal apparatus 120 are combined and continuously used, therefore, they can be used more simply and practically.

Furthermore, the information for the route search or the search information indicating the destination are moved to the newly started vehicle navigation apparatus 140. In the case of a travel to one destination while combining and continuously using the vehicle navigation apparatus 140 and the terminal apparatus 120, therefore, the necessary search information can be transferred more simply.

Furthermore, delivery and receipt of the search information required for switchover of the navigation apparatus is executed by radio connection conforming to the Bluetooth standards. Therefore, transfer of the search information can be effected more simply.

Furthermore, the portable terminal apparatus 120 and the vehicle navigation apparatus 140 can be combined and continuously used. During the travel using the vehicle 101 and the travel on foot, therefore, the navigation processing can be conducted effectively and continuously.

In the description of the embodiment, the navigation processing executed between the terminal apparatus 120 and the information server apparatus 110 is temporarily interrupted and the processing is transferred to the navigation processing using the vehicle navigation apparatus 140 alone. Besides, however, the navigation processing may be first executed only by using the vehicle navigation apparatus 140. When a power switch of the terminal apparatus 120 is turned on during that time, it is supposed that navigation processing using the terminal apparatus 120 and the information server apparatus 110 should be executed and the search information used in the navigation processing using the vehicle navigation apparatus 140 alone until then is transferred to the terminal apparatus 120 by radio. In this case as well, effects similar to those of the above described embodiment can be obtained.

In addition, it is possible to store programs corresponding to the flow charts respectively shown in FIG. 5 on an information recording medium such as a flexible disk or a hard disk. Or it is possible to download the programs via a network such as the Internet and store them. By reading out and executing the programs by using general-purpose microcomputers respectively provided in the information server apparatus 110, the vehicle navigation apparatus 140 and the terminal apparatus 120 as the system control sections 114, 147 and 130, the microcomputers can also be made to function as the system control sections 114, 147 and 130.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-304018 filed on Sep. 28, 2001 including the specification, claims, drawings and summary is incorporated herein by reference in its entirety.

What is claimed is:

1. An information server apparatus included in a navigation system including an information server apparatus, a portable communication navigation apparatus for conducting navigation processing of assisting travel of a first mobile while conducting communication with the information server apparatus, and a mobile navigation apparatus for conducting navigation processing of assisting travel of a second mobile different from the first mobile independently of the information server apparatus while traveling together with the second mobile, wherein the navigation system comprising:

a detecting device which detects whether first one of the communication navigation apparatus and the mobile navigation apparatus is started during execution of the navigation processing in second one of the communication navigation apparatus and the mobile navigation apparatus;

a transfer device responsive to detection that one of the communication navigation apparatus and the mobile navigation apparatus is started, which transfers information for the navigation processing used in the second one of the communication navigation apparatus and the mobile navigation apparatus that has been operated until then, from the second one to the first one; and a start device which starts the navigation processing in the first one by using the transferred information, and wherein the information server apparatus comprises:

a temporary stop request detecting device which detects whether a temporary stop request is received, the temporary stop request being transmitted from the communication navigation apparatus when the mobile navigation apparatus is started during execution of communication navigation processing, the communication navigation processing being the navigation processing conducted between the information server apparatus and the communication navigation apparatus, the temporary stop request indicating temporary stop of the communication navigation processing executed until then;

a stop device responsive to reception of the temporary stop request, which temporarily stops the communication navigation processing and stores information used in the communication navigation processing executed until then;

a resumption request detecting device which detects during temporary stop of the communication navigation processing whether a resumption request is received from the communication navigation apparatus, the resumption request indicating resumption of the communication navigation processing; and a resumption device responsive to reception of the resumption request, which resumes the communication navigation processing based on the resumption request and the stored information.

2. A server processing method executed in the information server apparatus included in a navigation method executed in a navigation system, the navigation system including an information server apparatus, a portable communication navigation apparatus for conducting navigation processing of assisting travel of a first mobile while conducting communication with the information server apparatus, and a mobile navigation apparatus for conducting navigation processing of assisting travel of a second mobile different from the first mobile independently of the information server apparatus while traveling together with the second mobile, wherein the navigation method comprises:

a detecting process of detecting whether first one of the communication navigation apparatus and the mobile navigation apparatus is started during execution of the navigation processing in second one of the communication navigation apparatus and the mobile navigation apparatus;

a transfer process, responsive to detection that one of the communication navigation apparatus and the mobile navigation apparatus is started, of transferring information for the navigation processing used in the second one of the communication navigation apparatus and the mobile navigation apparatus that has been operated until then, from the second one to the first one; and a start process of starting the navigation processing in the first one by using the transferred information, and wherein the server processing method comprises:

a temporary stop request detecting process of detecting whether a temporary stop request is received, the temporary stop request being transmitted from the communication navigation apparatus when the mobile navigation apparatus is started during execution of communication navigation processing, the communication navigation processing being the navigation processing conducted between the information server apparatus and the communication navigation apparatus, the temporary stop request indicating temporary stop of the communication navigation processing executed until then;

a stop process, responsive to reception of the temporary stop request, of temporarily stopping the communication navigation processing and storing information used in the communication navigation processing executed until then;

a resumption request detecting process of detecting during temporary stop of the communication navigation processing whether a resumption request is received from the communication navigation apparatus, the resumption request indicating resumption of the communication navigation process; and a resumption process, responsive to reception of the resumption request, of resuming the communication navigation processing based on the resumption request and the stored information.

3. A server processing program for a server computer included in the information server apparatus which is included in the navigation system using a navigation program for computers included in a navigation system, the navigation system including an information server apparatus, a portable communication navigation apparatus for conducting navigation processing of assisting travel of a first mobile while conducting communication with the information server apparatus, and a mobile navigation apparatus for conducting navigation processing of assisting travel of a second mobile different from the first mobile independently of the information server apparatus while traveling together with the second mobile, wherein the navigation program making the computers function as:

a detecting device which detects whether first one of the communication navigation apparatus and the mobile navigation apparatus is started during execution of the navigation processing in second one of the communication navigation apparatus and the mobile navigation apparatus;

a transfer device responsive to detection that one of the communication navigation apparatus and the mobile navigation apparatus is started, which transfers information for the navigation processing used in the second one of the communication navigation apparatus and the mobile navigation apparatus that has been operated until then, from the second one to the first one; and a start device which starts the navigation processing in the first one by using the transferred information, and wherein the server processing program making the server computer as:

a temporary stop request detecting device which detects whether a temporary stop request is received, the temporary stop request being transmitted from the communication navigation apparatus when the mobile navigation apparatus is started during execution of communication navigation processing, the communication navigation processing being the navigation processing conducted between the information server apparatus and the communication navigation apparatus, the temporary stop request indicating temporary stop of the communication navigation processing executed until then;

a stop device responsive to reception of the temporary stop request, which temporarily stops the communication navigation processing and stores information used in the communication navigation processing executed until then;

a resumption request detecting device which detects during temporary stop of the communication navigation processing whether a resumption request is received from the communication navigation apparatus, the resumption request indicating resumption of the communication navigation processing; and a resumption device responsive to reception of the resumption request, which resumes the communication navigation processing based on the resumption request and the stored information.

4. An information recording medium storing the server processing program according to claim 3 so as to be able to be read by the server computer.

* * * * *